(12) United States Patent
Beaulieu

(10) Patent No.: US 9,011,980 B1
(45) Date of Patent: Apr. 21, 2015

(54) DAMPENING DEVICE AND METHOD OF MAKING

(71) Applicant: Studio Lab, LLC, New Cumberland, PA (US)

(72) Inventor: Cristian Gene Beaulieu, New Cumberland, PA (US)

(73) Assignee: Studio Lab, LLC, New Cumberland, PA (US)

( * ) Notice: Subject to any disclaimer, the term of this patent is extended or adjusted under 35 U.S.C. 154(b) by 50 days.

(21) Appl. No.: 13/786,971

(22) Filed: Mar. 6, 2013

Related U.S. Application Data

(60) Provisional application No. 61/612,281, filed on Mar. 17, 2012.

(51) Int. Cl.
 *B05D 1/36* (2006.01)
 *B32B 27/08* (2006.01)
 *B32B 27/40* (2006.01)

(52) U.S. Cl.
 CPC ............... *B32B 27/08* (2013.01); *B32B 27/40* (2013.01)

(58) Field of Classification Search
 None
 See application file for complete search history.

(56) References Cited

U.S. PATENT DOCUMENTS

| | | | |
|---|---|---|---|
| 3,797,355 A | 3/1974 | Law | |
| 4,325,280 A | 4/1982 | Hardy | |
| 4,808,469 A | 2/1989 | Hiles | |
| 5,100,704 A * | 3/1992 | Iwakura et al. | 427/302 |
| 5,637,819 A | 6/1997 | Rogers | |
| 5,986,196 A | 11/1999 | Behrenfeld | |
| 6,092,324 A | 7/2000 | Lepage et al. | |
| 6,598,319 B2 | 7/2003 | Hardt | |
| 6,908,979 B2 | 6/2005 | Arendoski | |
| 2001/0051219 A1* | 12/2001 | Peter et al. | 427/385.5 |
| 2002/0096811 A1 | 7/2002 | Callsen et al. | |
| 2004/0070156 A1 | 4/2004 | Smith et al. | |
| 2004/0147707 A1* | 7/2004 | Arendoski | 528/58 |
| 2005/0200059 A1 | 9/2005 | Smith et al. | |
| 2007/0197672 A1* | 8/2007 | Lekovic et al. | 521/103 |
| 2008/0063883 A1* | 3/2008 | Han et al. | 428/522 |
| 2008/0214769 A1 | 9/2008 | Pohl et al. | |
| 2009/0320324 A1 | 12/2009 | Yang et al. | |
| 2012/0060304 A1 | 3/2012 | Yang et al. | |

OTHER PUBLICATIONS

Sorbothane available from http://en.wikipedia.org/wiki/Sorbothane; access date Jan. 30, 2013.

(Continued)

*Primary Examiner* — Erma Cameron
(74) *Attorney, Agent, or Firm* — McNees Wallace & Nurick LLC

(57) ABSTRACT

A dampening device and method of making are provided, in which the method includes providing a first layer of a sponge rubber. An isocyanate-base prepolymer and a polyol base curing agent are combined to form a curable liquid urethane polymer. The curable liquid urethane polymer is shredded and during shredding air in the form of micro-bubbles is entrained in the curable liquid urethane polymer. The curable liquid urethane polymer is applied to form a second layer overlying the first layer and is then cured to form a tacky polyurethane cast elastomer. Micro-bubbles remain present in the tacky polyurethane cast elastomer and curing bonds the first and second layer forming a dampening device. The dampening device includes a first layer of neoprene and a second layer of a micro-bubble infused tacky polyurethane cast elastomer bonded to the first layer.

15 Claims, 1 Drawing Sheet

(56) References Cited

OTHER PUBLICATIONS

Gel Damping Pads available from http://www.lantecsnc.it/en/products/accessories/gel-damping-pads.html; access date Jan. 30, 2013.

Low Viscosity Polyurethane Gel Casting System available from http://northstarpolymers.com/NorthstarPolymers/Gel/GK-7/GK-7.htm; access date Jan. 30, 2013; copyright date 2000-2007.

* cited by examiner

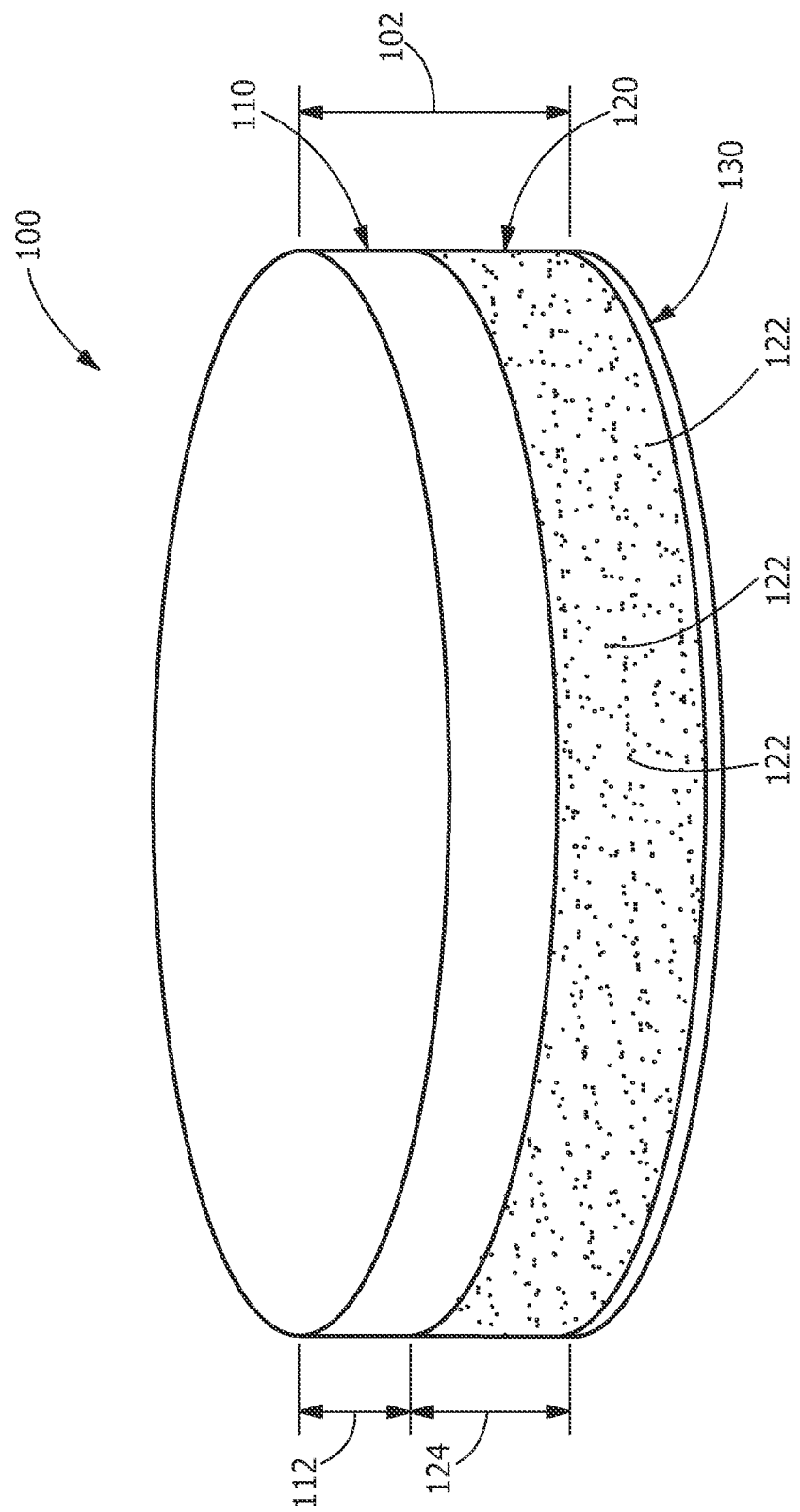

DAMPENING DEVICE AND METHOD OF MAKING

CROSS-REFERENCE TO RELATED APPLICATIONS

This patent application claims the benefit of U.S. Provisional Patent Application Ser. No. 61/612,281 filed on Mar. 17, 2012 the disclosure of which is incorporated by reference as if fully rewritten herein.

FIELD OF THE INVENTION

This invention relates to dampening devices, and more particularly, to a method for forming an elastomeric dampening device that is adhesive and repositionable on a variety of surfaces.

BACKGROUND OF THE INVENTION

Many articles, such as instruments and sports and outdoor equipment experience vibration during use. Instruments vibrate as a result of sound waves that are produced. Oftentimes it is desired to reduce or dampen the vibration or tones generated by an instrument, for example on drumheads. Sports and outdoor equipment also vibrate from use. One example of a vibration felt by a user of a sports implement, such as a metal baseball bat, is the "tink" that results from contact of the bat surface with a ball. Another example of vibration from outdoor equipment includes archery equipment. The audible noise created by the string and bow de-tensioning can be heard and recognized by deer and other game animals and felt by the user as the arrow leaves the bow.

Percussive instruments, such as drums, cymbals, cow bells, etc., are oftentimes dampened. Most of the prior art devices used to dampen percussive instruments feature contacting the drumhead with a substance that is capable of absorbing some of the higher overtones. For example, U.S. Pat. No. 5,637,819 discloses a gel patch or "patch type" percussive dampening material wherein the gel is a two-phase colloidal system consisting of a solid and liquid phase, containing in an exemplary embodiment, 3% soybean oil.

Commercially available "patch type" percussive dampening materials, when applied to the vibrating drumhead or percussive instrument, have numerous shortcomings. Among these shortcomings are the seepage of oil, sometimes with an unsightly stain, onto the surface of the drumhead by the material of the gel patch. Another shortcoming includes the inability to effectively "stick" to the drumhead. Yet another shortcoming is that prior art percussive instrument dampening materials have little or no positive adhesion and are limited to placement on the horizontal plane on the surface of the percussive instrument. Still another shortcoming is that prior art percussive instrument dampening materials are incapable of remaining on a vertical plane or reverse horizontal plane without mechanical means. Another shortcoming is these dampening materials lack the ability to remain on violently vibrating surfaces, such as crash cymbals, for any practical period of time. Yet another shortcoming is that most prior art percussive dampening materials begin to flap, buzz and release almost instantly from even horizontal surfaces and exhibit unsophisticated sound control characteristics. Another shortcoming disclosed in some of the prior art patch dampening devices is their relative ineffectiveness at dampening certain overtones. Some patch materials may "dry out" over a period of time, thus lessening their dampening ability.

As already noted, problems of undesired vibration are not unique to percussive instruments. Other areas include sports and outdoor equipment. Prior art sporting equipment vibration control devices (e.g., for archery bows, aluminum baseball bats, golf clubs and tennis racquets) are either nonexistent or are bulky unsophisticated contraptions without the ability to be moved readily and maintain position and vibration control under extreme forces. Prior art sporting equipment vibration control devices generally lack the ability to be placed and replaced many times for user customization without losing adhesion or vibration control characteristics in whole or in part.

These and other drawbacks are found in current dampening devices.

SUMMARY OF THE INVENTION

According to an exemplary embodiment of the present disclosure a method of making a dampening device is provided. The method includes providing a first layer comprising a sponge rubber. An isocyanate-base prepolymer is combined with a polyol base curing agent to form a curable liquid urethane polymer. The curable liquid urethane polymer is shredded, which entrains air in the form of micro-bubbles into the curable liquid urethane polymer. The curable liquid urethane polymer is applied to the first layer to form a second layer overlying a first surface of the first layer. The curable liquid urethane polymer of the second layer is cured to form a tacky polyurethane cast elastomer. Micro-bubbles remain present in the tacky polyurethane cast elastomer. Curing bonds the first and second layer forming the dampening device.

According to another exemplary embodiment of the present disclosure a method of making a dampening device is provided. The method includes providing a layer of neoprene on a vibratable vacuum table. An isocyanate-base prepolymer containing 4,4'-methylene diphenyl diisocyanate is combined with a polyether polyol curing agent containing a tertiary amine in a weight ratio of about 1:9.29 prepolymer to curing agent to form a curable liquid urethane polymer. The curable liquid urethane polymer is shredded for a time period in the range of about 80 to about 120 seconds. Shredding entrains air in the form of micro-bubbles into the curable liquid urethane polymer. A layer of the curable liquid urethane polymer is applied to a first surface of the neoprene layer while vibration and a vacuum is applied to the neoprene layer by the vibratable vacuum layer. The curable liquid urethane polymer is cured to form a tacky polyurethane cast elastomer. Micro-bubbles remain present in the tacky polyurethane cast elastomer. Curing bonds the tacky polyurethane cast elastomer to the neoprene to form the dampening device.

According to another exemplary embodiment of the present disclosure a dampening device is provided. The dampening device includes a first layer comprising neoprene and a second layer bonded to the first layer. The second layer comprises a micro-bubble infused tacky polyurethane cast elastomer having a thickness of at least 0.125 inches.

One advantage of an embodiment of the present disclosure is that the dampening device absorbs a wide variety of vibrations and sound wavelengths in extreme atmospheric conditions.

Another advantage of an embodiment of the present disclosure is that the dampening device adheres to almost any surface on any plane under stress.

Yet another advantage of an embodiment of the present disclosure is that the dampening device adheres to surfaces without damaging the surface once the dampening device is removed.

Still another advantage of an embodiment of the present disclosure is that the dampening device may be positioned and repositioned on a surface many times without loss of tack.

Another advantage of an embodiment of the present disclosure is that the dampening device remains in place on a surface under stress and vibration.

Yet another advantage of an embodiment of the present disclosure is that the dampening device exhibits the ability to arrest more extreme vibrations in large machinery, such as windmills, as the size or footprint of the dampening device is increased.

Other improvements and advantages will be apparent from the remainder of this application for patent.

Other features and advantages of the present disclosure will be apparent from the following more detailed description of the preferred embodiment, taken in conjunction with the accompanying drawing which illustrates, by way of example, the principles of the invention.

BRIEF DESCRIPTION OF THE DRAWINGS

FIG. 1 is a perspective view of a dampening device in accordance with an exemplary embodiment.

Wherever possible, the same reference numbers will be used throughout the drawings to represent the same parts.

DETAILED DESCRIPTION OF THE INVENTION

Provided is a dampening device and method of making a dampening device. While illustrated and described primarily with respect to use with instruments, including percussive instruments such as drums and cymbals, it will be appreciated that the invention is not so limited and that the dampening device so created can be employed in conjunction with any other item in need of dampening, including, without limitation, sports implements, such as archery bows, baseball bats, golf clubs, tennis racquets, and the like.

The inventor has surprisingly discovered that the method described herein results in a tacky urethane cast elastomer that has benefits heretofore unknown, including an ability to bond neoprene or other sponge rubbers to form a dampening device that is effective at removing undesirable vibrations and overtones, can be adhered to essentially any solid surface in need of such dampening, remains adhered even when the article having the surface is subject to the stress of its ordinary use (such as aggressively beating a drumhead or cymbal or using sports equipment to strike another object), and can be removed by the user without leaving a stain or residue while still retaining sufficient tack for subsequent re-use.

Referring to FIG. 1, a perspective view of a dampening device 100 is provided. The dampening device 100 includes a first layer 110 and a second layer 120. In one embodiment, the dampening device 100 includes a quick release sheet 130 adjacent second layer 120. In one embodiment, the quick release sheet 130 is made from silicon or other suitable material. The dampening device 100 generally has a thickness 102 of about 0.2 inches to about 0.4 inches. The dampening device 100 is resilient and resumes its original shape after being compressed. The dampening device 100 is tacky to strongly adhere to surfaces, yet easily removable by users without staining or leaving a residue upon removal. The dampening device 100 does not lose tack after multiple positioning and repositioning on surfaces.

The first layer 110 provides stability to the second layer 120. The first layer 110 provides dampening properties to the dampening device 100. The first layer 110 may be any material that imparts a dampening effect. One suitable material is a sponge rubber and neoprene is preferred. In one embodiment the first layer 100 is neoprene. The thickness 112 of first layer 100 is about 0.125 inches to about 0.3 inches.

As shown in FIG. 1, the second layer 120 is bonded to the first layer 110. The second layer also provides dampening properties to the dampening device 100 and also acts to releasably adhere the dampening device 100 to the surface of an article, including, without limitation, metal, plastic, composite, or glass, any or all of which might be used in articles in need of dampening, including those described elsewhere herein. Thus the dampening device 100 when placed on a surface, sticks to that surface until a user removes it. The second layer 120 does not lose the ability to adhere to surfaces after multiple uses and repositioning on surfaces but retains tack after repeated placement and repositioning on surfaces. It further does not damage surfaces or leave residue on surfaces when removed from surfaces.

The second layer 120 is a tacky polyurethane cast elastomer having micro-bubbles 122. The tacky polyurethane cast elastomer is formed by combining and shredding a prepolymer (also referred to herein as the first component) with a curing agent (also referred to herein as the second component) in a mixer that also results in the formation of micro-bubbles that are entrained within the shredded mixture.

Without being bound by theory, it is believed that both the shredding and the entrainment of micro-bubbles result in a less dense and softer polyurethane cast elastomer that results in excellent adhesion and allows the second layer 120 to be very tacky, yet completely removable. In particular, it was observed that a tacky polyurethane cast elastomer with micro-bubbles formed by shredding was markedly softer and tackier than unshredded polyurethane systems otherwise having the same weight ratio of prepolymer to curing agent.

The first component of the tacky polyurethane cast elastomer of the second layer 120 is an isocyante-base prepolymer. One suitable isocyante-base prepolymer is MPG-023 from Northstar Polymers, LLC (Minneapolis, Minn.), which contains 4,4'-methylene diphenyl diisocyanate (MDI) and has an NCO content of 18.6% (±0.5%).

The second component used to form the tacky polyurethane cast elastomer is a polyol base curing agent. One suitable polyol base curing agent is PNC-153, also available from Northstar Polymers, LLC that contains polyether polyols and a tertiary amine catalyst and has an OH content of about 31 to about 42 KOH mg/g.

The curing agent should be maintained at a constant temperature of about 90-91° F. prior to mixing with the prepolymer. The blending ratio between the first component (i.e. the prepolymer) and the second component (i.e. the curing agent) is at least 1:9.22, typically at least 1:9.23 and preferably about 1:9.29, all by weight.

To make the tacky polyurethane cast elastomer of the second layer 120, the first and second components are first combined, with the polymerization reaction beginning almost immediately. The combination is shredded by a mixer while the reaction occurs. Thus, the isocyanate-base prepolymer is combined with the polyol base curing agent to form a curable liquid urethane polymer.

Any mixing that accomplishes shredding of the curable liquid urethane polymer may be employed. In one embodiment, the mixer is imparted with two mixing paddles; the first mixing paddle is a dispersion blade including multiple vertical straight blades on the bottom of the mixing shaft and situated adjacent to the bottom of a mixing container. One suitable paddle is the RP130 two inch wide, four vertical blade paddle with shaft available from INDCO Inc. of New Albany, Ind. The second mixing paddle includes a plurality of horizontal propeller blades and is positioned above the first paddle on the shaft. A suitable type of the second mixing paddle is the A531 two inch propeller blade available from Caframo Limited, Georgian Bluffs, Ontario, Canada. The propeller bladed paddle creates a large vortex that is pounded and disrupted by the straight blade paddle directly underneath. The vortex pulls air into the mixture.

The vertical blade paddle shreds the curable liquid urethane polymer making it unstable while infusing micro-bubbles into it. The micro-bubbles are entrained air bubbles in the curable liquid urethane polymer and which remain even after curing. Thus, the curable liquid urethane polymer (and the resulting cured urethane cast elastomer) of the present disclosure includes air bubbles, which are generally undesirable and avoided in traditional polyurethane systems.

During shredding, the mixing container is moved in a clockwise fashion counter to the rotation of first and second mixing blades. To combine the first component and the second component, the first and second mixing blades are run at a speed of about 2400 rpm to about 2500 rpm for about 80 seconds to about 120 seconds, preferably at a temperature in the range of about 72° F. to about 80° F. During shredding, the curable liquid urethane polymer becomes very frothy and starts to harden, trapping in the air bubbles thereby forming micro-bubbles. After shredding, the container holding the curable liquid urethane polymer may be shaken for a short period of time, typically about three seconds to about ten seconds, to settle the curable liquid urethane polymer for pouring.

After shredding, the curable liquid urethane polymer is poured to form a second layer 120 overlying a first surface of the first layer 110, which is laid flat. In some embodiments, the first layer 110 may be laid flat on a vibrating vacuum table. Any kind of table that accomplishes concurrent vibration while under vacuum may be employed, which can be achieved, for example through the use of commercially available vacuum tables that either already employ or can be modified to introduce a source of vibration while the vacuum is applied.

A foam gasket material may be adhered to the outer perimeter of the first layer 110 to establish a frame to limit the spread of the liquid urethane polymer. Within one minute after shredding and shaking the liquid urethane polymer, it is poured onto the first layer 110 while the table is vibrating and under vacuum. The vibrating vacuum table applies vacuum and vibration to the second surface of the first layer 110. The vibration aids in achieving an even distribution while the vacuum holds the first layer 110 flat. The vibrating vacuum table, through mechanical vibration and suction, evenly spreads or levels out the curable liquid urethane polymer to form the second layer 120 on the first layer 110. The thickness 124 of the second layer 120 is typically in the range of about 0.125 inches to about 0.3 inches.

If more than about one minute, and typically more than about thirty five seconds elapses between shaking and pouring, the curable liquid urethane polymer loses sufficient flowability to spread across the first layer 110.

The curable liquid urethane polymer of the second layer 120 is permitted to cure and as that occurs, the second layer 120 bonds with the first layer 110 thereby forming the dampening device 100. Upon curing, the curable liquid urethane polymer forms a tacky polyurethane cast elastomer. A suitable level of cure can be achieved, for example, by curing at ambient temperature (about 68° F.-82° F.) for a period of about fifty hours to about one hundred hours, typically about three days.

As the second layer 120 is curing, or after curing, a quick release sheet 130 may be applied to the second layer 120. It will be appreciated that the dampening device 100 may advantageously be formed as a large sheet and that after the second layer 120 has fully cured, the dampening device 100 may be cut into any desirable shape or size. For example, a larger sheet may be cut into a plurality of dampening devices having a circular shape with a diameter in the range of about one to two inches. It will further be appreciated that the size and shape of any particular dampening pad may depend on the article with which it will be used and the level of dampening that is desired.

EXAMPLES

The invention has been reduced to practice and has been determined to have excellent performance characteristics.

Samples of circular pieces of the dampening device 100 having a diameter in the range of one to two inches and made according to the method described herein underwent field tests on a variety of drum types (e.g., snare, tom, bass, etc.) employing vibrating membranes or heads. In some tests one dampening device 100 was used, in other tests, multiple dampening devices were used.

The devices were adhered to the top (batter) surface as well as the bottom (resonant) head and were left there until the user removed it. The users reported no flapping or lifting of the dampening device from the surfaces even when applied to the resonant head and found that buzzing was eliminated. In trials with the sample devices near the rim of the drum head, the devices were observed to remove the high end frequency, sometimes referred to as over-ring, from the drum without removing the innate tone of the drum, while also increasing the attack and response of the drum.

Samples of the dampening device cut into circular pieces of about one inch were placed near the bell of a cymbal, either on the top or underneath. The dampening device was observed to result in a slight darkening and warming of the sound from the cymbal. When the dampening device was placed at the outside edge of the cymbal, it significantly reduced the high frequency sounds that are believed to be the most dangerous to the human ear drum. A similar effect was discovered when samples were used on other instruments such as cowbells, blocks, xylophone, vibraphone, glockenspiel, tubular bells, etc. The overall dampening effect was further observed to depend upon placement of the dampening device 100 on the instrument, which may vary in different circumstances depending on the desired musical effect sought to be achieved.

Samples of the dampening device cut into circles having a diameter in the range of about one to two inches were placed also placed on archery bows. The archers reported having experienced a satisfying decrease in the audible noise created by the release of the string and de-tensioning of the bow when using the dampening device. The archers also discovered a noticeable reduction in the amount of vibration transferred to the hands of the shooter. In some cases, the devices were able to change the windage path of the arrow by as much as two inches at thirty yards. As with the percussion instruments, the devices remained adhered to the bow until the shooter removed it.

Likewise, samples of the dampening device of various shapes and sizes were adhered to different areas of aluminum baseball bats and in all cases, the audible noise of the bat was reduced. Players using bats to which the samples had been applied also noticed reduced transfer of vibratory shock to their hands when the bat struck the ball.

Finally, samples of the dampening device were used on golf club drivers. Placement of the samples was varied and included areas of both the club head and the shaft. Players reported a softening of the sound that occurs as the club struck the ball as well as a softening of the feel of the strike through the hands at impact when a sample was placed on the club. When the sample was placed on the shaft, players reported a noticeable difference in transfer of vibration to the hands at impact. Placement of the sample also affected the weighting of the club and allowed the players to manipulate, by speeding up or slowing down, the closing of the club face at impact, imparting a draw spin bias or cut spin bias to the flight of the ball as measured against a player's declared natural tendency.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of making a dampening device comprising:
   providing a first layer comprising a sponge rubber;
   combining an isocyanate-base prepolymer with a polyol base curing agent to form a curable liquid urethane polymer;
   shredding the curable liquid urethane polymer at a speed of at least about 2,400 rpm, wherein the shredding entrains air in the form of bubbles into the curable liquid urethane polymer;
   applying the curable liquid urethane polymer to form a second layer overlying a first surface of the first layer;
   curing the curable liquid urethane polymer of the second layer to form a tacky polyurethane cast elastomer, wherein bubbles remain present in the tacky polyurethane cast elastomer and wherein the curing bonds the first and second layer forming the dampening device.

2. The method of claim 1, wherein the step of applying comprises applying the second layer overlying the first surface of the first layer while vacuum and vibration are concurrently applied to the first layer.

3. The method of claim 1, further comprising, after the step of curing, cutting the dampening device to a desired shape.

4. The method of claim 1, wherein the first layer comprises neoprene.

5. The method of claim 1, wherein the step of combining includes combining the isocyanate-base prepolymer with the polyol base curing agent in a weight ratio that is at least 1:9.22.

6. The method of claim 5, wherein the ratio, by weight, of the isocyanate-base prepolymer to the polyol base curing agent is about 1:9.29.

7. The method of claim 1, wherein the isocyanate base prepolymer comprises 4,4'-methylene diphenyl diisocyanate.

8. The method of claim 1, wherein the polyol base curing agent comprises polyether polyols and a tertiary amine catalyst.

9. The method of claim 1, further comprising applying a quick release sheet to the second layer during or after the step of curing.

10. The method of claim 1, further comprising adhering a foam gasket material on an outside perimeter of the first layer before the step of applying.

11. The method of claim 1, wherein the step of shredding is carried out for about 80 seconds to about 120 seconds.

12. The method of claim 1, wherein the step of shredding is carried out for about 100 seconds.

13. The method of claim 1, wherein the thickness of the first layer is about 0.125 inches to about 0.3 inches.

14. The method of claim 1, wherein the thickness of the second layer is 0.125 inches to about 0.3 inches.

15. A method of making a dampening device comprising:
   providing a layer of neoprene on a vibratable vacuum table;
   combining an isocyanate-base prepolymer containing 4,4'-methylene diphenyl diisocyanate with a polyether polyol curing agent containing a tertiary amine in a weight ratio of about 1:9.29 prepolymer to curing agent to form a curable liquid urethane polymer;
   shredding the curable liquid urethane polymer for a time period in the range of about 80 to about 120 seconds, wherein the shredding entrains air in the form of bubbles into the curable liquid urethane polymer;
   applying a layer of the curable liquid urethane polymer to a first surface of the neoprene layer while vibration and a vacuum is applied to the neoprene layer by the vibratable vacuum table;
   curing the curable liquid urethane polymer to form a tacky polyurethane cast elastomer, wherein the bubbles remain present in the tacky polyurethane cast elastomer and wherein the curing bonds the tacky polyurethane cast elastomer to the neoprene to form the dampening device.

* * * * *